June 27, 1967
E. J. NOLAN ETAL
3,327,659
COMBINATION REFUSE-AND SNOW-REMOVAL
Filed July 6, 1964
2 Sheets-Sheet 1
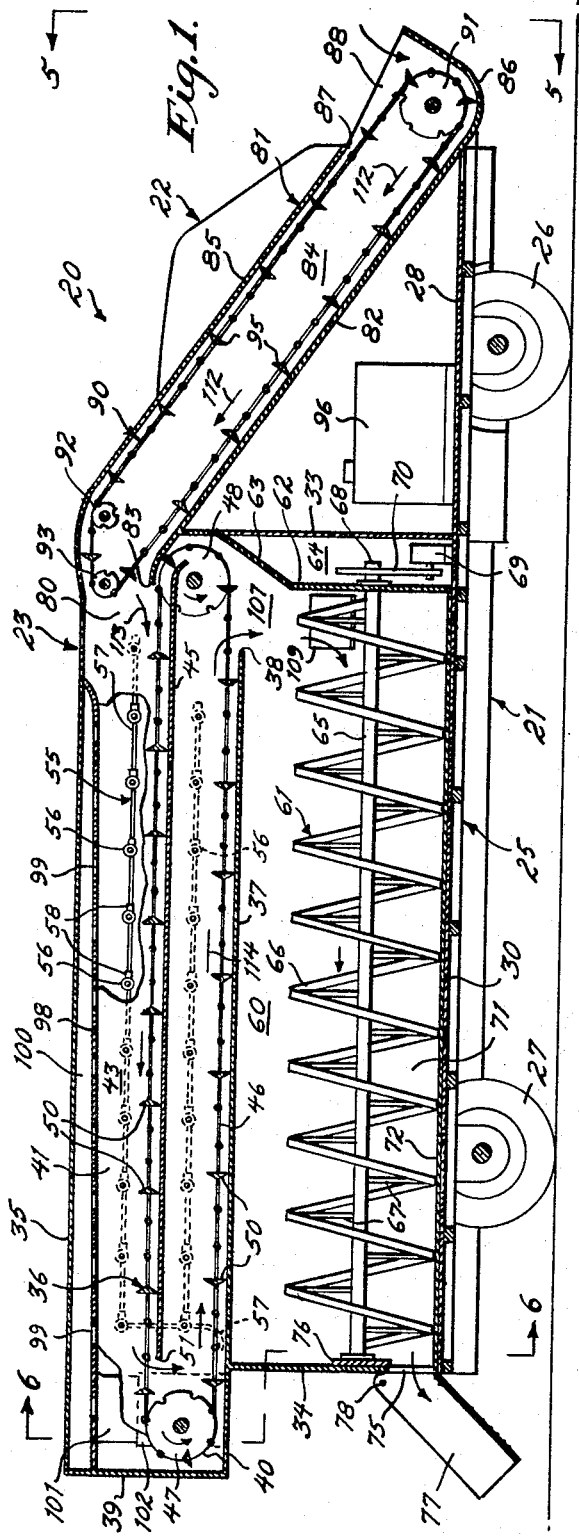
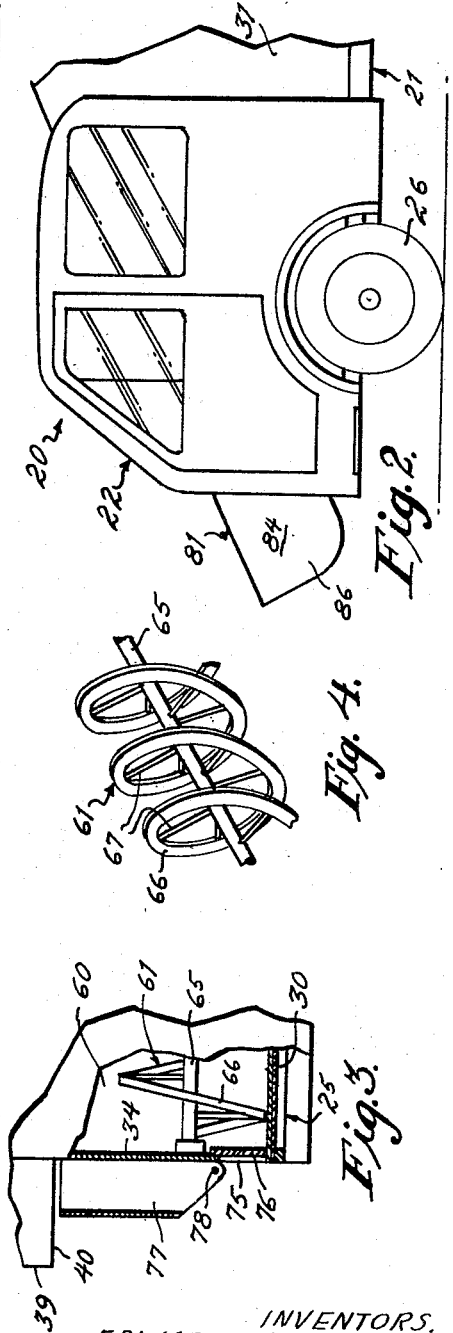
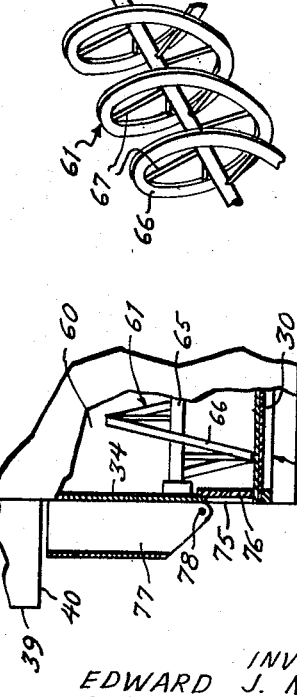
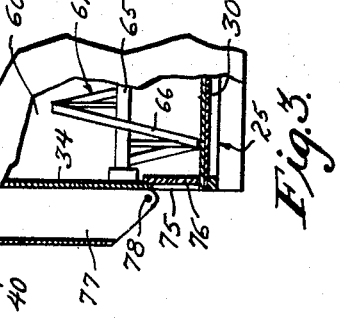
INVENTORS.
EDWARD J. NOLAN
CHARLES C. MEEKS
NATHAN ROSENFELD
FREDERICK J. LE QUIRE
BY
*Robert K. Youtie*
ATTORNEY.

June 27, 1967 E. J. NOLAN ETAL 3,327,659
COMBINATION REFUSE- AND SNOW-REMOVAL
Filed July 6, 1964 2 Sheets-Sheet 2

INVENTORS.
EDWARD J. NOLAN
CHARLES C. MEEKS
NATHAN ROSENFELD
FREDERICK J. LE QUIRE
BY
Robert K. Youtie
ATTORNEY

United States Patent Office 3,327,659
Patented June 27, 1967

3,327,659
COMBINATION REFUSE- AND SNOW-REMOVAL VEHICLE
Edward J. Nolan, Almonesson, Charles C. Meeks, Whitman Square, and Nathan Rosenfeld, Cinnaminson, N.J.; and Frederick J. Le Quire, Collingdale, Pa.; said Meeks assignor to National Mobile Incinerator Corporation, Philadelphia, Pa., a corporation of Pennsylvania
Filed July 6, 1964, Ser. No. 380,446
2 Claims. (Cl. 110—8)

This invention relates generally to incinerator vehicles, and is especially concerned with a unique combination refuse- and snow-removal vehicle.

As is well known, municipalities and others concerned with the removal of refuse and snow presently, for the most part, employ separate specialized equipment for each of these operations. Of course, this requires two complete sets of different equipment, the snow-removal equipment being idle in the absence of snow, and the refuse-removing equipment usually being idle during use of the snow-removal equipment. Further, both specialized types of equipment usually involve collection, subsequent removal to a dumping area, and unloading thereat. The cycle is therefore seriously limited by the holding size of the vehicle.

While mobile refuse-incineration and snow-melting apparatus has been proposed in the past, these proposals have been impractical and have not found commercial acceptance.

Accordingly, it is an object of the present invention to provide a unique and highly efficient mobile apparatus for the incineration of refuse and melting of snow, which overcomes the above-mentioned difficulties, eliminates the need for two specialized types of apparatus, affords optionally selective operation for either or both functions, and greatly increases the possible working time by considerably reducing the frequency of dumping.

It is a further object of the present invention to provide a vehicle construction of the type described which is capable of trash or refuse incineration and snow removal at relatively high vehicle speeds to minimize or eliminate traffic problems previously incident to refuse and snow removal, and which is entirely safe in operation without disagreeable smoke discharge.

It is another object of the present invention to provide a combination refuse-and-snow-removal vehicle having the advantageous characteristics mentioned in the preceding paragraphs, which is simple in structure, staunch and durable in construction, reliable in operation throughout a long useful life, and which can be manufactured, operated and maintained at reasonable cost, to achieve substantial economies in use.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a longitudinal sectional view taken generally along the line 1—1 of FIGURE 5 showing a vehicle constructed in accordance with the teachings of the present invention and illustrating its discharging condition;

FIGURE 2 is a partial longitudinal elevational view showing the forward portion of the vehicle of FIGURE 1, and taken from the right-hand side of FIGURE 5;

FIGURE 3 is a fragmentary side elevational view showing a rear portion of the vehicle of FIGURE 1, partly broken away to show the interior thereof and illustrating a nondischarging condition;

FIGURE 4 is a partial perspective view showing in greater detail a preferred form of discharge conveyor;

Figure 5:
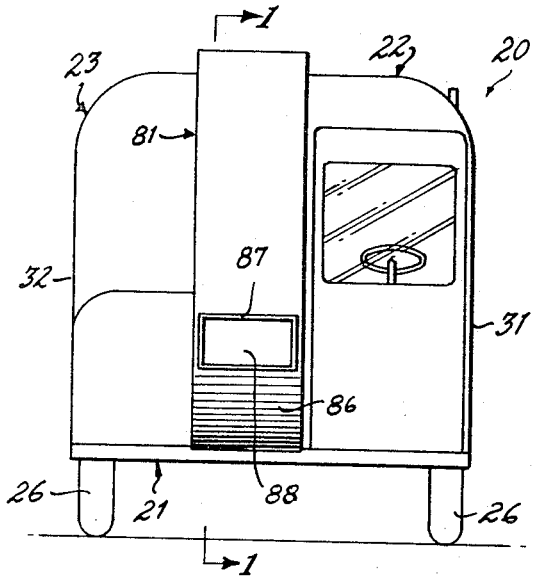
FIGURE 5 is a front elevational view showing the vehicle of FIGURE 1.

Referring now more particularly to the drawings, and specifically to FIGURE 1 thereof, a mobile unit or vehicle of the present invention is there generally designated 20, and includes a wheeled chassis 21 having a cab 22 mounted on a forward region of the chassis, and a working chamber or housing, generally designated 23 and mounted on the chassis rearward of the cab.

The chassis 21 may include an elongate, generally horizontal frame 25 rotatably carrying on its underside ground-engageable front wheels 26 and rear wheels 27. The cab 22 may be located on one side of the chassis 21 in the forward region thereof to leave an open chassis deck 28 alongside of the cab.

The housing 23 on the frame 25 may include a generally flat bottom wall 30 extending horizontally rearward from the cab 22 to the rear end of the chassis, and a pair of upstanding, left and right side walls 31 and 32 extending upwardly from opposite sides of the bottom wall. A front wall 33 is located immediately behind the cab 22, extending upwardly from the bottom wall 30 and laterally between the side walls 31, 32, while a rear wall 34 extends upwardly from the rear end of the bottom wall and laterally between the side walls. The upper regions of the side walls 31 may curve upwardly and inwardly to merge with opposite sides of a generally horizontal top wall 35 extending over the housing.

Figures 6, 7:
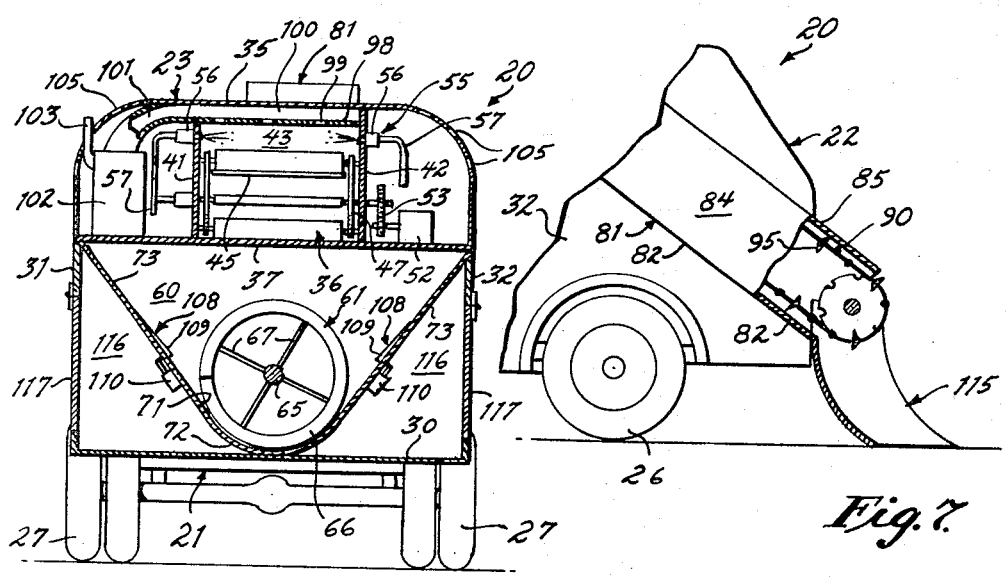
FIGURE 6 is a transverse sectional view taken generally along the line 6—6 of FIGURE 1.
FIGURE 7 is a partial side elevational view showing a front portion of the vehicle of FIGURE 1 and illustrating its condition of use in snow removal.

Extending longitudinally within an upper region of the housing 23 is a treating conveyor, generally designated 36. The treating conveyor 36 may include one or more runs, as desired, for purposes appearing presently; and, two runs are shown for purposes of illustration and without limiting intent. The upper region of housing 23 containing the treating conveyor 36 is partitioned or separated from the lower housing region by a generally horizontal floor 37 extending laterally between opposite housing walls 31 and 32, and terminating at 38, see FIGURE 1, short of the front housing wall 33, for a purpose appearing hereinafter. The rear wall 34 may have its upper portion 39 offset rearwardly, as by a rearward extension 40 of the horizontal wall 37. A pair of laterally spaced, generally vertical inner side walls 41 and 42 may be disposed longitudinally within the upper region of housing 23, each extending vertically between the horizontal wall 37 and top wall 35, as best seen in FIGURE 6. Thus, a treating chamber 43 is defined within the upper region of housing 23 in the space between horizontal wall 37, top wall 35, and inner side walls 41 and 42. The treating conveyor 36 is located in this treating chamber and includes a longitudinally extending generally horizontal intermediate floor or bed 45 spaced vertically between the walls 37 and 35. A pair of flexible endless elements or chains 46 extend longitudinally along and within treating chamber 43, each adjacent to a respective inner side wall and are trained about rotatably journaled sprocket wheels 47 and 48 at the rearward and forward ends, respectively, of the treating chamber. The endless flexible members or chains 46 are spaced laterally from each other and provided with a plurality of paddles or pushers 50 extending laterally between and connected to the endless elements. Upon rotation of the sprocket wheels 47 and 48, in the direction indicated by the arrows thereon in FIGURE 1, the paddles or pushers 50 are caused to move rearwardly along the bed 45, and forwardly along the horizontal wall 37. Thus, it will now be understood that the conveyor 36 includes a rearwardly moving upper run along the bed 45, which terminates at a rear edge 51 short of the rear end of horizontal wall 37, as at extension 40 for passing material from the rear end of bed 45 to the rear extension 40. Further, the extension 40 and horizontal wall 37 combine to define a bed for a forwardly moving lower run of conveyor 36 to discharge material therefrom past the forward bed end 38. Any suitable drive means may be employed to power the conveyor 36, such as a motor 52 and gear reducer 53, see FIGURE 6, connected in driving relation with sprocket wheel 47.

Along the upper and lower runs of conveyor 36 are provided heating means 55 for heating the material being conveyed by the treating conveyor. The heating means 55 may include a plurality of fluid jets or nozzles 56 arranged along the upper and lower runs of the treating conveyor 36 and connected by suitable conduit means 57 to a fuel supply (not shown). Associated with each jet or nozzle 56 may be a thermostatic control 58 for varying the jet flow and effecting shut-off of the respective jet, as warranted by the operating conditions.

Below the horizontal wall 37, in a lower chamber 60 of the housing 23 is a longitudinally extending discharge conveyor 61. The discharge conveyor 61 extends generally horizontally, forwardly and rearwardly within the lower chamber 60, and may advantageously be of a centrally open screw type. The lower chamber 60 includes a front wall 62 upstanding from the bottom wall 30 adjacent to and rearward of the front housing wall 33 and having an upper portion 63 sloping forwardly and upwardly to the front wall 33. Thus, an enclosed space 64 may be provided between the front housing wall 33 and front wall 62 of the lower chamber 60.

The screw conveyor 61 may include a generally horizontal, forwardly and rearwardly extending shaft 65 having its forward end journaled in the front wall 62 and having its rear end journaled in the rear wall 34. Extending spirally about the shaft 65 as an axis and spaced radially from the shaft is a helix or helical strip 66, which is fixedly secured to the shaft for rotation therewith by any suitable means, such as generally radial braces 67. A drive stub 68 may project from the forward end of shaft 65 forward of wall 62 for connection to a drive motor 69 by suitable power-transmission means 70.

The screw conveyor 61 includes a forwardly and rearwardly extending troughlike bottom wall 71 having an upwardly facing transversely arcuate lower portion 72 conformably receiving the lower portion of helix 66, and having upwardly and outwardly inclined side portions 73 extending generally to the side walls 31 and 32. Thus, the lower chamber 60 is bounded within the horizontal wall 37 and the trough 71 receiving the helix or screw 66. As will appear more fully hereinafter, the lower chamber 60 provides an accumulator for retaining treated material until discharge is desired.

The rear housing wall 34 may be provided in its lower region with a discharge opening 75 communicating with the rearward end of lower trough portion 72; and, a shiftable gate or closure 76 may be mounted for opening and closing movement with respect to the outlet opening 75. Also, a discharge chute 77 may be located externally of the housing 23 adjacent to the rear wall 34 for movement between a discharging position shown in FIGURE 1 in communication with the outlet opening 75, and an inoperative position shown in FIGURE 3 swung upwardly toward the wall 34. That is, the chute 77 may be swingably mounted on the wall 34, as by pivot means 78.

At the forward end of the upper run of treating conveyor 36 there is provided an inlet opening 80; and, a loading conveyor, generally designated 81 extends upwardly and rearwardly over the deck 28 for communication with the housing inlet 80. The loading conveyor 81 is of generally tubular construction including a lower wall 82 inclining upward from in front of the chassis 21 into the housing opening 80 where it terminates at an edge 83. A pair of generally parallel side walls 84 upstand from and extend along opposite side edges of the bottom wall 82, and a top wall 85 extends laterally between the upper edges of the side walls spacedly over the bottom wall 82. A lower end section 86 is detachably secured to the lower ends of bottom and side walls 82 and 84, and has its upper side open. Further, the lower end of top wall 85 terminates at an edge 87 short of the lower section 86 and combines with the latter to define an upwardly facing receiver opening 88.

A pair of laterally spaced, flexible endless members or chains 90 are arranged within the housing of loading conveyor 81, being trained about lower sprocket wheels 91, and upper sprocket wheels 92 and 93. The sprocket wheels 91, 92 and 93 are journaled by any suitable means for rotation about horizontal axes and suitable drive means (not shown) are provided for effecting rotation of chains 90 in the clockwise direction, as seen in FIGURE 1.

Extending laterally between and connected to the laterally spaced loading-conveyor chains 90 are a plurality of pushers or paddles 95. The pushers 95 move with the chains 90 for conveying material upward along the bottom wall 82, and return downward along the underside of top wall 85. In the region beneath the loading conveyor 81, on the deck 28, may be mounted auxiliary equipment, such as a fuel tank 96, and other required apparatus.

Extending rewardly along and spacedly beneath the underside of top housing wall 35, laterally between the inner side walls 41 and 42, is a flue wall 98. The wall 98 may be apertured along its length, as at 99, and combines with the top housing wall 35 and inner side walls 41 and 42 to define a flue passageway 100 extending readwardly and through an elbow 101, FIGURE 6, to a flue-gas treatment device 102, such as an afterburner or other suitable means for eliminating smoke. The flue-treatment device or afterburner 102 may be provided with an outlet stack or discharge tube 103 for discharging treated flue gases to the atmosphere.

The outer side walls 31 and 32 may be formed with air-inlet openings 105 to provide combustion air for the fuel-burning nozzles 56. The combustion air may pass through the nozzles, or other suitable openings into the treating-conveyor chamber for burning of fuel to effect the desired heating.

Movement of treating conveyor 36 beyond horizontal wall edge 38 effects transfer of material from the treating conveyor to the discharge conveyor 61 at a transfer station or region 107 adjacent to the wall 62. Detector means 108 may be provided in the forward region of discharge conveyor 61, as by leaves or sensing elements 109 in the trough walls 74. These sensing elements 109 are deflectable downward under load to actuate switches 110 which are connected to the conveyor drive 69 for energizing the latter. Thus, the conveyor 61 may be automatically energized upon the transfer of treated material from the treating conveyor 36 to the discharge conveyor 61.

In one mode of operation, the vehicle 20 is moved along a street, being driven by an operator in the cab 22, and another operator deposits refuse in the lower end of loading conveyor 81, through the receiving opening 88. The loading conveyor 81 moves in the direction of arrows 112 for conveying refuse along wall 82 and therefrom through housing inlet opening 80 to a loading station of the treating conveyor 36. The refuse is then moved along the treating conveyor rearwardly in the direction of arrows 113 along bed 45, and thence forwardly in the dirrection of arrows 114 along bed 37. During movement of material by conveyor 36, incineration of the material is taking place, so that completely incinerated material is transferred through transfer opening 107 to discharge conveyor 61. Of course, the temperature in treating-conveyor chamber 43, as well as the period of material movement through the treating-conveyor chamber are controlled to achieve optimum incineration.

Upon transfer of incinerated material from treating conveyor 36 to discharging conveyor 61, depression of load-sensing elements 108 effects operation of screw 66 to move the incinerated material rearward along the accumulator trough 71. Thus, as material is deposited in the forward end of trough 71, the screw 66 rotates to move the material rearwardly beyond the sensing means 108, when the screw rotation ceases.

As treated material is moved toward the rear housing wall 34 of the accumulation chamber 60, the gate or closure 76 may remain closed, and by reason of the open construction of screw 66, the screw may continue turning and the rearwardly accumulated material will be caused to tumble through the central opening of the screw. In this way, the discharge conveyor 61 may operate intermittently and accumulate a full load in the trough 71 without excessively compacting the material against the rear wall 34. When it is desired to discharge the material from the accumulator chamber 60, the gate 76 may be raised and the chute 77 lowered, to the position of FIGURE 1, whereupon rotation of screw 66 will effect the desired discharge.

Incineration in the treating chamber 43 is effected by burning of fuel at jets 56, say fuel from tank 96 or other suitable supply. The burning may be manually controlled, if desired, or automatically controlled by the thermostats 58 to open and close the associated jets for producing the desired incineration temperature.

Combustion gases from the treating chamber 43 are drawn through flue 100 to the flue-gas treatment device or afterburner 102, for discharge of relatively clean flue gas from stack 103.

Figure 8:
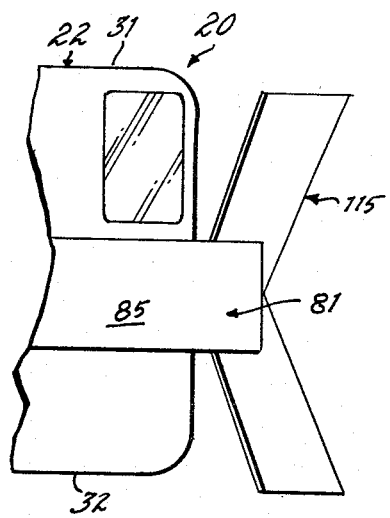
FIGURE 8 is a top plan view of the snow-removal condition shown in FIGURE 7.

In addition to the operation described above, the vehicle 20 is capable of snow-removal operation, as shown in FIGURES 7 and 8. It will there be seen that the lower end section 86 of the loading conveyor 81 has been removed and replaced by a scoop or plow 115 adapted to gather snow and direct the latter upward to the bottom wall 82 of the loading conveyor. The gathered snow is then carried along the path of the treating conveyor where it is melted and thence transfered to the lower housing chamber 60. Upon accumulation of substantial liquid in the lower housing chamber 60, the outlet gate 76 may be opened for discharge of the liquid to a storm sewer, or other appropriate liquid receiver. While it may not be necessary to employ the smoke eliminator or afterfurner 102 in the snow-melting operation, the products of combustion received by the smoke eliminator may, if desired, be redirected to the loading conveyor 81 for effecting premelting of the snow. Also, if desired, salt spreading may accompany the snow-removal operation. Of course, refuse gathered together with snow will be suitably treated upon movement through the housing 23 for discharge therefrom. Also, discharge of melted liquid while the vehicle is moving could be accomplished under certain conditions of operation without refreezing.

While the operations described hereinbefore have been stated as sequential, it is understood that the operation may advantageously be continuous for handling a maximum of material.

Use may be made of the lower regions of housing 23 on opposite sides of the accumulation chamber 60, as inside chambers 116. There may be provided access doors 117 in side walls 31 and 32 for loading noncombustible refuse, if desired. Also, provision may be employed for spraying fuel or the like on refuse moving through the loading conveyor 81 to facilitate incineration thereof in the treating chamber 43.

From the foregoing, it is seen that the present invention provides a combination refuse-and-snow-removal device which fully accomplishes its intended objects, is well adapted to meet practical conditions of manufacture, maintenance and operation.

Although the present invention has been described in some detail by way of illustration and example for purposes of clarity of understanding, it is understood that certain changes and modifications may be made within the spirit of the invention and scope of the appended claims.

What is claimed is:

1. A combination refuse- and snow-removal vehicle comprising a wheeled chassis, a housing carried by said chassis longitudinally thereof and having a forward inlet and a rearward outlet, a treating conveyor in an upper region of said housing extending between a loading station communicating with said inlet for receiving material to be treated and a transfer station communicating with a lower forward region of said housing for transferring treated material, heating means in said housing along said treating conveyor for treating material on said treating conveyor, a discharge conveyor in said housing below said treating conveyor for receiving treated material from said transfer station and discharging treated material through said outlet, said discharge conveyor being open for moving treated material toward said outlet while permitting countermovement thereof to prevent congestion at said outlet, and sensing means associated with said discharge conveyor for sensing the reception by said discharge conveyor of treated material from said transfer station for actuating said discharge conveyor.

2. A combination refuse- and snow-removal vehicle comprising a wheeled chassis, a housing carried by said chassis longitudinally thereof and having a forward inlet and a rearward outlet, a treating conveyor in an upper region of said housing extending between a loading station communicating with said inlet for receiving material to be treated and a transfer station communicating with a lower forward region of said housing for transferring treated material, heating means in said housing along said treating conveyor for treating material on said treating conveyor, and a discharge conveyor in said housing below said treating conveyor for receiving treated material from said transfer station and discharging treated material through said outlet, said discharge conveyor being open for moving treated material toward said outlet while permitting countermovement thereof to prevent congestion at said outlet, and said discharge conveyor comprising a longitudinally centrally open helix.

References Cited

UNITED STATES PATENTS 1,462,527   7/1923   Tully.
1,659,564   2/1928   Duncan _____ 110—8

FREDERICK L. MATTESON, JR., *Primary Examiner.*

H. B. RAMEY, *Assistant Examiner.*